Patented Oct. 10, 1944

2,360,308

UNITED STATES PATENT OFFICE 2,360,308

POLYVINYL RESIN AND METHOD OF MANUFACTURING THE SAME

Charles A. Thomas, Dayton, Ohio, and Stewart B. Luce, Springfield, Mass., assignors to Monsanto Chemical Company, St. Louis, Mo., a corporation of Delaware No Drawing. Application June 11, 1940, Serial No. 339,884

7 Claims. (Cl. 260—73)

This invention relates to improvements in polyvinyl resins and the methods of manufacturing these resins. The present invention relates particularly to the production of improved polyvinyl alcohols and polyvinyl acetals.

The discovery of certain desirable properties of these resins and their plastic compositions has caused these polyvinyl resins to become increasingly important in recent years. This has lead to considerable work relating to the solution of the various problems connected with their preparation.

One of the applications of polyvinyl acetals is their use in laminated compositions, for example, in the manufacture of safety glass. It is obvious that such an application requires, among other properties, color-free and color-stable materials.

It is an object of this invention to provide a process whereby the manufacture of polyvinyl alcohols and polyvinyl acetals having improved properties is greatly facilitated.

It is a further object of this invention to provide a process for manufacturing color-free and color-stable polyvinyl alcohols and polyvinyl acetals obtained therefrom.

Polyvinyl acetals generally have been prepared heretofore by procedures involving the following steps:

(a) Preparation of a monomeric vinyl ester-generally vinyl acetate; (b) polymerization of the monomeric vinyl ester; (c) hydrolysis of the polyvinyl ester to the polyvinyl alcohol in the presence of a mineral acid, as for example, sulphuric acid; (d) acetalization of the polyvinyl alcohol with a suitable aldehyde or plurality of aldehydes in the presence of a mineral acid, as for example, sulphuric acid.

Many difficulties have accompanied the use of such processes. For example, the concentration of mineral acid catalyst had to be carefully controlled to avoid side reactions and/or discoloration of the reactants and at the same time avoid an unduly long reaction period. Furthermore, the removal of the mineral acid catalyst was extremely difficult, whether effected by washing the acid per se from the product or by first neutralizing the acid and then washing the product to remove the salts thus formed. After most careful purification, the products frequently had only limited stability toward heat discoloration.

According to this invention, it has been found that the hydrolysis and acetalization reactions are greatly facilitated and improved products obtained if these reactions are effected as hereinafter described.

It has been discovered that polyvinyl formate can be advantageously substituted for polyvinyl acetate which is generally employed in the preparation of polyvinyl acetals. Polyvinyl formate has been found to hydrolyze much more readily than polyvinyl acetate and other polyvinyl esters, thus making it possible to dispense with the use of mineral acids or other added catalysts as promoters of these reactions. More specifically, it has been discovered that polyvinyl formate can be hydrolyzed by the action of water without the presence of an added catalyst. Of course, hydrolysis of polyvinyl formate under such conditions produces formic acid which, in turn, serves to accelerate the hydrolysis reaction. However, it is frequently advantageous to further accelerate the hydrolysis by the addition of a certain amount of an organic acid, preferably a lower aliphatic organic acid, as for example, formic acid. The use of an organic acid, such as formic acid, for the hydrolysis of the polyvinyl formate has the further advantage that it can also serve to promote the acetalization of the resulting polyvinyl alcohol. This process overcomes the disadvantages hereinbefore described that accompany the use of mineral acids as catalysts. The reactants are not subject to the discoloration and side-reactions that accompany the use of mineral acids so that the reaction conditions are not as critical. The formic acid catalyst is easily removed and improved products are obtained.

The marked improvement in the preparation of polyvinyl alcohols by the hydrolysis of polyvinyl formate in place of other polyvinyl esters, for example, polyvinyl acetate, is shown by the following specific examples. These examples indicate the impracticability of hydrolyzing polyvinyl acetate in the absence of mineral acids and, at the same time, the ease of hydrolysis of polyvinyl formate without the use of mineral acids.

All parts are parts by weight in these and subsequent examples.

*Example 1*

Vinyl acetate, prepared by passing acetylene into acetic acid in the presence of a mercury catalyst, was polymerized to polyvinyl acetate, with a molecular weight of substantially 29,000, by means of one of the well-known methods for polymerizing vinyl esters, for example, polymerization in benzene solution with benzoyl peroxide as the catalyst. 10 parts of polyvinyl acetate, prepared by the process given above, were hydrolyzed by the action of an aqueous solution comprising 90 parts of water and 10 parts of formic acid at 90–100° C. 85 hours were required to effect complete solution.

*Example 2*

Vinyl formate, prepared by passing acetylene into formic acid, preferably in the presence of the catalyst described in the co-pending patent application Ser. No. 284,201, filed by Grafton R.

Owens on July 13, 1939, was polymerized to polyvinyl formate with a molecular weight of substantially 25,000, by means of one of the well-known methods for polymerizing vinyl esters, for example, polymerization in acetone solution with benzoyl peroxide as the catalyst. 10 parts of polyvinyl formate, prepared by the process given above, were hydrolyzed by the action of an aqueous solution comprising 93 parts of water and 3.6 parts of formic acid at 90-98° C. Only 8 hours were required to effect complete solution.

*Example 3*

10 parts of polyvinyl acetate, prepared as described in Example 1, were hydrolyzed by the action of an aqueous solution comprising 7.8 parts of water, 18.3 parts of glacial acetic acid and 0.7 parts of sulphuric acid (96%) at 70° C. 30 hours were required to effect complete solution.

*Example 4*

10 parts of polyvinyl formate, prepared as described in Example 2, were hydrolyzed by the action of an aqueous solution comprising 90 parts of water and 0.7 parts of sulphuric acid (96%) at 90-100° C. 9 hours were required to effect complete solution.

The polyvinyl alcohols prepared in Examples 1, 2, 3, and 4 were separated from their hydrolysis solutions by pouring the solutions separately into vigorously stirred acetone. The precipitated polyvinyl alcohols were separated from the acetone, dried and subjected to the heat stability test, hereinafter described.

A small quantity of finely ground polyvinyl alcohol is placed on the bottom of a 125 cc. Erlenmeyer flask, loosely stoppered by a cork wrapped with tin-foil. The flask and contents are placed in an oven at 150° C. for one hour and the change in color of the polyvinyl alcohol observed.

As a result of being subjected to the conditions of this stability test, the products of Examples 1 and 2 remained white, the product of Example 3 turned from white to dark brown, and the product of Example 4 turned from white to brown.

The above examples clearly show the improvement in polyvinyl alcohols prepared in accordance with the present invention.

It has also been found advantageous as has been previously stated, to carry out the acetalization of polyvinyl alcohols to form polyvinyl acetals in the presence of formic acid, rather than in the presence of a mineral acid. The following is a specific example of this invention in the preparation of a polyvinyl acetal but is not to be construed as limiting the scope thereof. The reaction was carried out in equipment suitably constructed for this purpose.

*Example 5*

32.8 parts of polyvinyl formate, prepared as described in Example 2, were hydrolyzed by the action of an aqueous solution comprising 64 parts of water and 3.1 parts of formic acid. Without isolating the polyvinyl alcohol from the hydrolysis solution, 48 parts of butyraldehyde and 275 parts of acetone were added and the mixture was reacted at 90° C. The polyvinyl acetal, thus obtained, was precipitated by dilution with water. The product, on analysis, was found to contain 15.9% unreacted hydroxyl groups, 75.6% acetalized hydroxyl groups and 8.5% esterified hydroxyl groups.

It is to be understood that, in the operation of this invention, variations may be introduced in the process. Thus, the formic acid concentration is subject to wide variation. Furthermore, other water-soluble readily ionized organic acids and preferably the lower aliphatic acids may be employed in place of formic acid. The invention is not limited, for example, as to the molecular size of the polyvinyl formate, the solvent employed, solution concentration, or temperature of hydrolysis. Other aldehydes or even ketones may be employed in the acetalization of the polyvinyl alcohol. Thus, for example, formaldehyde, acetaldehyde, propionaldehyde, valeraldehyde, heptaldehyde, benzaldehyde, crotonaldehyde and cyclohexanone or mixtures thereof may be substituted for butyraldehyde.

The present invention is limited solely by the claims attached hereto.

What is claimed is:

1. A process for the manufacture of a polyvinyl alcohol comprising the hydrolysis of polyvinyl formate in an aqueous medium containing formic acid as the acid catalyst, the hydrolysis being continued until solution occurs.

2. A process for the manufacture of a polyvinyl alcohol comprising hydrolyzing polyvinyl formate in a heated aqueous medium containing formic acid as the acid catalyst, the hydrolysis being continued until solution occurs.

3. A process for the manufacture of a polyvinyl alcohol comprising hydrolyzing polyvinyl formate in an aqueous medium heated at 90-98° C. and containing formic acid as the acid catalyst, the hydrolysis being continued until solution occurs.

4. In a process for the manufacture of a polyvinyl acetal, the steps comprising the hydrolysis of polyvinyl formate in an aqueous medium containing formic acid as the acid catalyst, the hydrolysis being continued until solution occurs, and the acetalization of the polyvinyl alcohol obtained thereby.

5. In a process for the manufacture of a polyvinyl formaldehyde acetal, the steps comprising the hydrolysis of polyvinyl formate in an aqueous medium containing formic acid as the acid catalyst, the hydrolysis being continued until solution occurs, and the acetalization with formaldehyde of the polyvinyl alcohol obtained thereby.

6. In a process for the manufacture of a polyvinyl acetaldehyde acetal, the steps comprising the hydrolysis of polyvinyl formate in an aqueous medium containing formic acid as the acid catalyst, the hydrolysis being continued until solution occurs, and the acetalization with acetaldehyde of the polyvinyl alcohol obtained thereby.

7. In a process for the manufacture of a polyvinyl butyraldehyde acetal, the steps comprising the hydrolysis of polyvinyl formate in an aqueous medium containing formic acid as the acid catalyst, the hydrolysis being continued until solution occurs, and the acetalization with butyraldehyde of the polyvinyl alcohol obtained thereby.

CHARLES A. THOMAS.
STEWART B. LUCE.